United States Patent [19]

Hegemann

[11] 4,104,982
[45] Aug. 8, 1978

[54] TRANSMISSION GEAR RATIO INDICATOR

[75] Inventor: Norbert R. Hegemann, Burlington, Wis.

[73] Assignee: Allis-Chalmers Corporation, Milwaukee, Wis.

[21] Appl. No.: 841,050

[22] Filed: Oct. 11, 1977

[51] Int. Cl.² .............................................. F16H 5/76
[52] U.S. Cl. .............................. 116/124 M; 74/473 P
[58] Field of Search ..................... 116/DIG. 20, 115.5, 116/124 A, 124 M; 74/473 P, 473 SW, 475, 476, 477

[56] References Cited

U.S. PATENT DOCUMENTS

| | | | |
|---|---|---|---|
| 1,402,395 | 1/1922 | Bradley | 116/124 M |
| 3,795,157 | 3/1974 | Campbell et al. | 74/473 R X |

Primary Examiner—Jerry W. Myracle
Attorney, Agent, or Firm—Arthur L. Nelson

[57] ABSTRACT

A transmission shift lever position indicator for shifting gear ratios in a transmission from the control console whereby the indicator correlates the shift lever position with the gear ratio of the transmission to indicate to the operator the position of the shift lever and transmission gear ratio.

10 Claims, 6 Drawing Figures

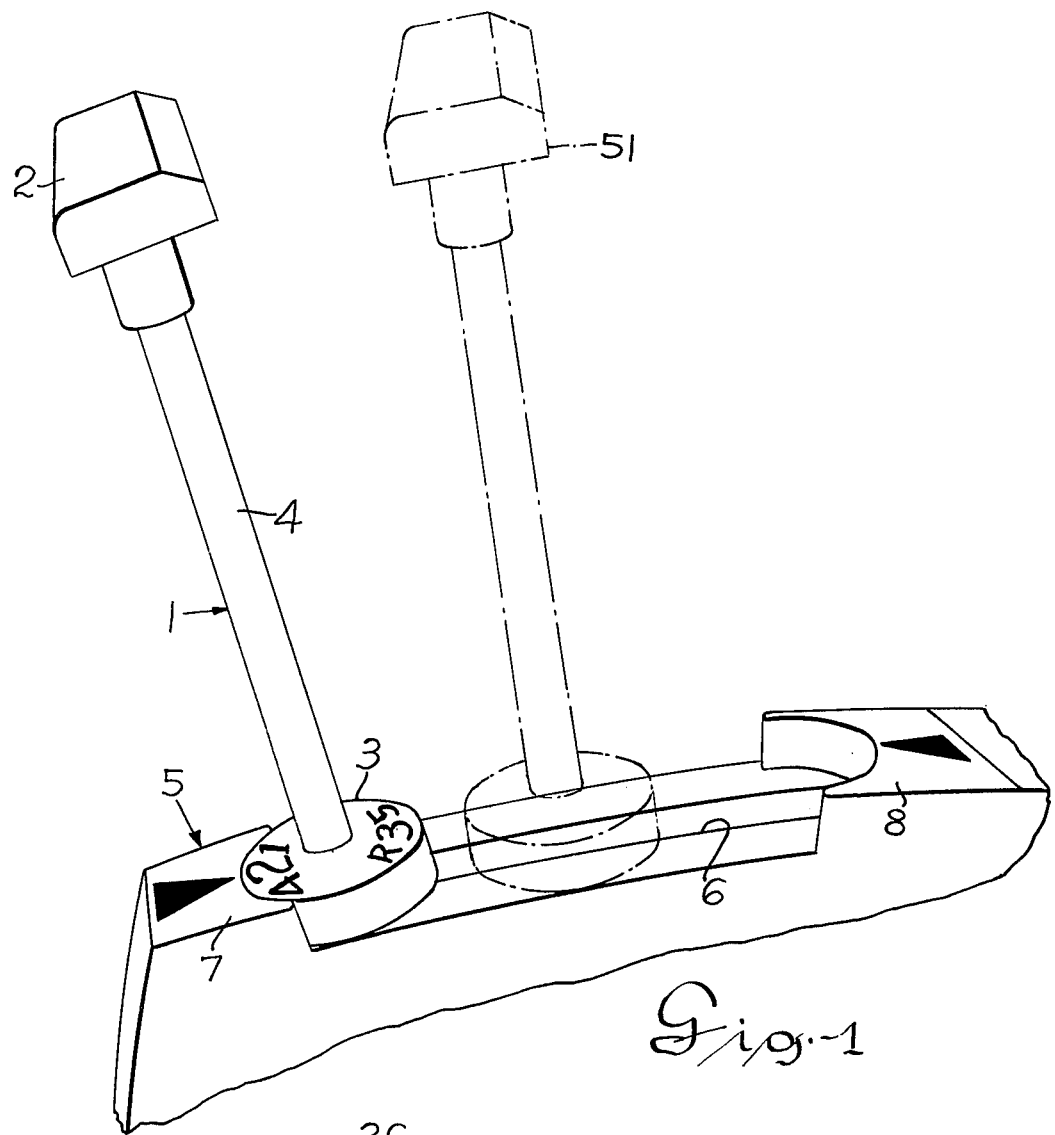
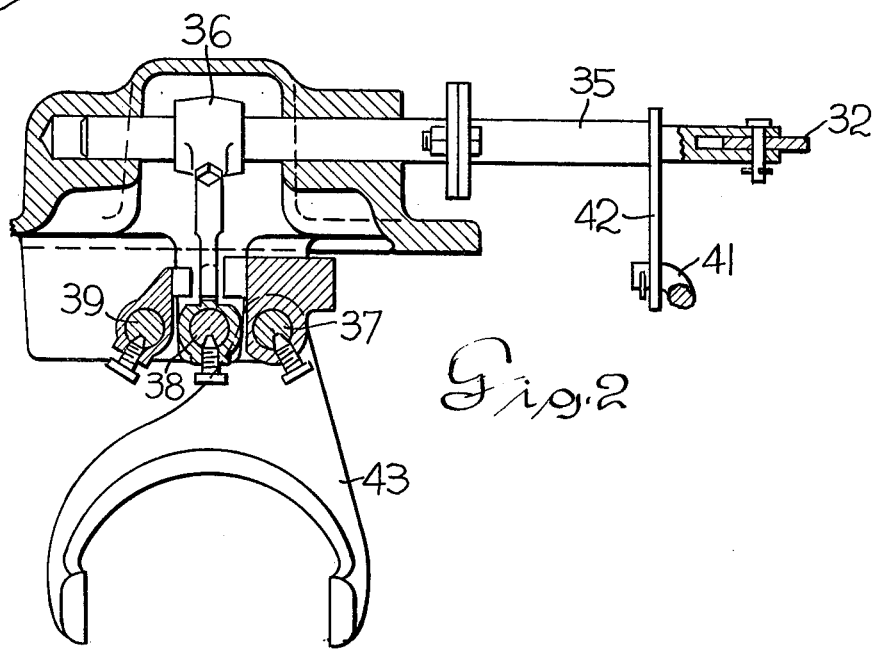

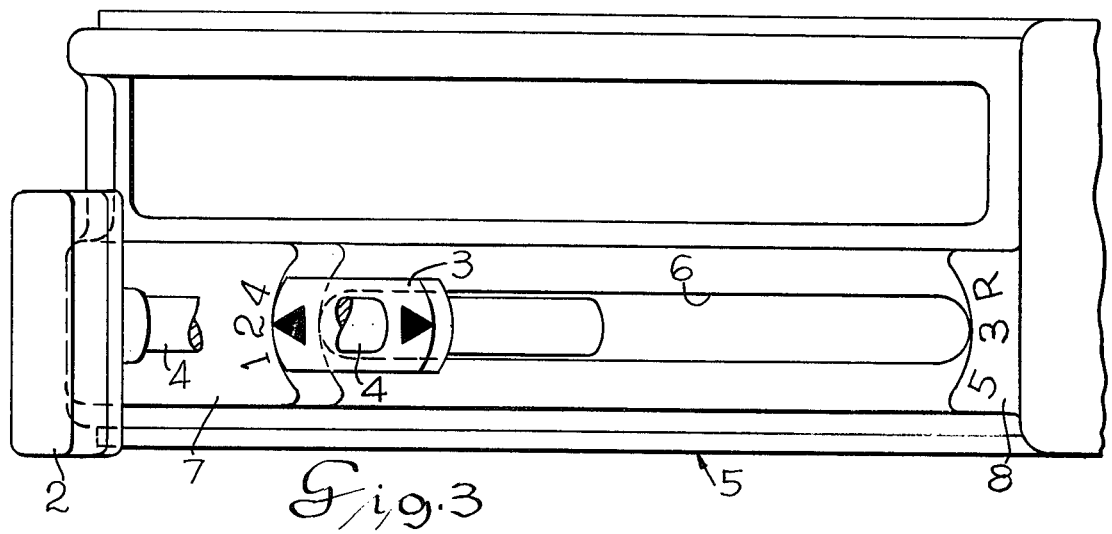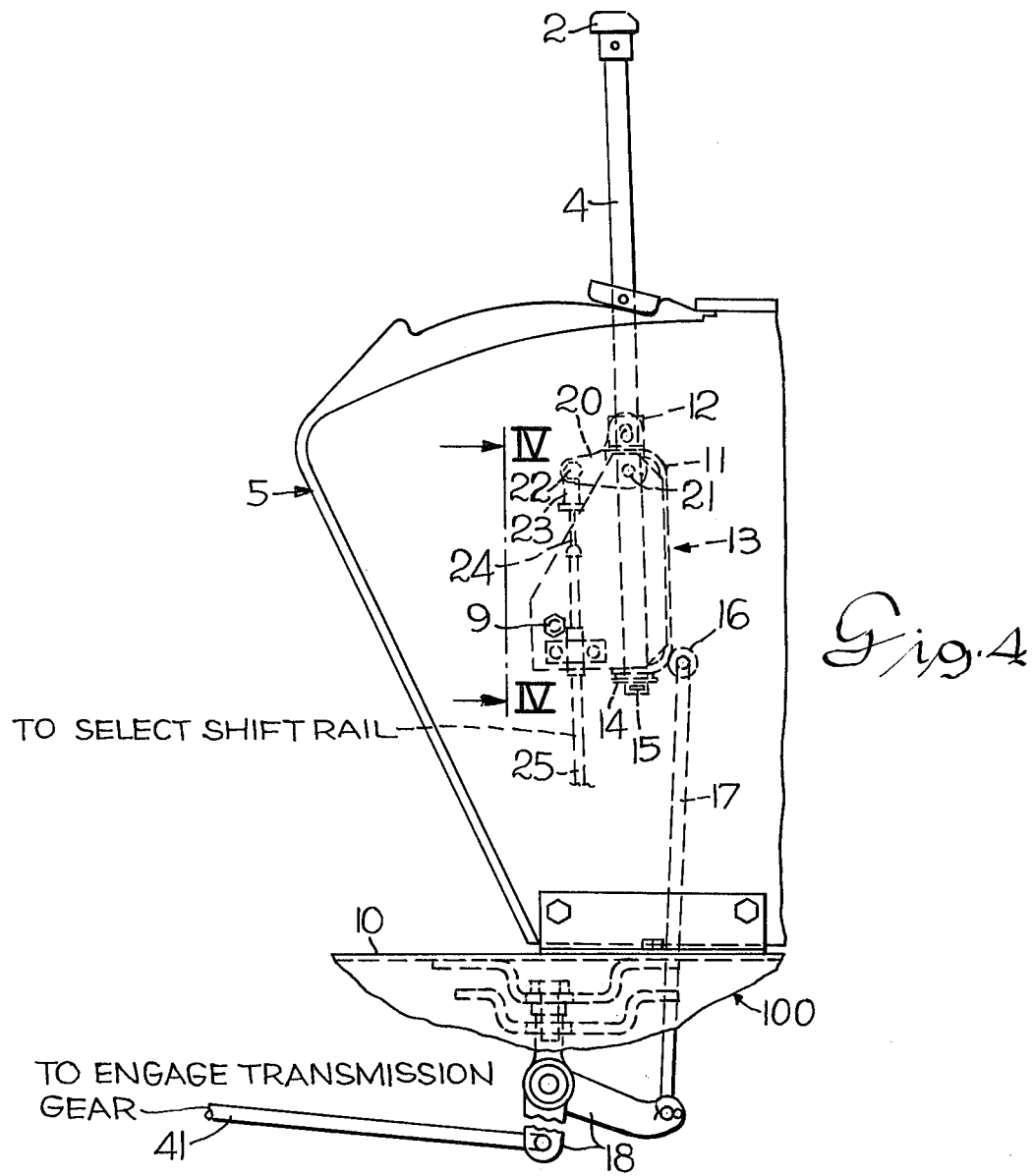

TRANSMISSION GEAR RATIO INDICATOR

This invention relates to a shift lever for a transmission and more particularly to a shift lever position indicator whereby the shift lever position in a control console is indicated to the operator as well as the gear ratio engaged in the transmission.

Vehicle transmission shift levers are generally pivotally mounted to normally actuate a linkage operating the shifting of the gears in the transmission. The shift lever is often mounted in a control console having an H pattern of connecting slots to define the movement of the shift lever and the positions in which a shift lever may be shifted. Normally the shift lever can be pivoted in one or two directions to provide the number of shifting positions for the lever as is necessitated by number of gear ratios in the vehicle transmission. The shift lever covered by this invention, however, has a rotatable handle operating through a linkage to selectively engage one of a plurality of shift rails. Once the shift rail is engaged by the linkage from the shift lever, the lever can be pivoted fore and aft to shift the transmission into the desired gear ratio. Since the control console forms a slot defining the pivotal movement of the shift lever, the rotational position of the handle is not as easily visible to the operator, and accordingly an indicator is provided in connection with the shift lever and the control console. This indicator provides a means whereby an operator can readily see the position of the shift lever and the speed ratio of the transmission correlated with the shift lever when it is in any of the positions.

It is an object of this invention to provide a gear shift indicator on a transmission shift lever for indicating the position of the shift lever.

It is another object of this invention to provide an indicator for a transmission shift lever having means for rotating and pivotally supporting the lever whereby the indicator shows the shift position of the lever.

It is a further object of this invention to provide a transmission shift lever indicator including a dial and a gate plate having numbers and a pointer for indicating to the operator the transmission shift lever position.

It is a further object of this invention to provide a pointer on the control console and an indicator dial on the shift lever or vice versa to indicate to the operator the shift position of the shift lever.

The preferred embodiment to this invention is provided by a shift lever rotatably mounted for rotation on a longitudinal axis and pivotally mounted in a control console for pivotal movement fore and aft in a gate plate of the control console. An indicator having numbers and an arrow to indicate to the operator the position of the lever and the transmission gear ratio selected is provided. Selective rotation and pivotal movement of the shift lever is indicated to the operator in any of the gear shift positions. Since the rotation of the lever selectively engages a shift rail, this position is indicated to the operator as the lever is pivoted fore and aft to selectively reciprocate the selected shift rail for engaging the transmission in the selected gear ratio.

Referring to the drawings, the preferred embodiments of this invention are illustrated.

FIG. 1 illustrates a three-dimensional view of the indicator on a shift lever.

FIG. 2 is a section view of the shift rails and the shift rail selector and a portion of the linkage connected to the transmission.

FIG. 3 is a plan view of a modification of the shift lever and an indicator.

FIG. 4 illustrates the side-elevation view of the shift lever and indicator as shown in FIG. 3 with the shift lever moved to its most rearward position.

Figure 5:
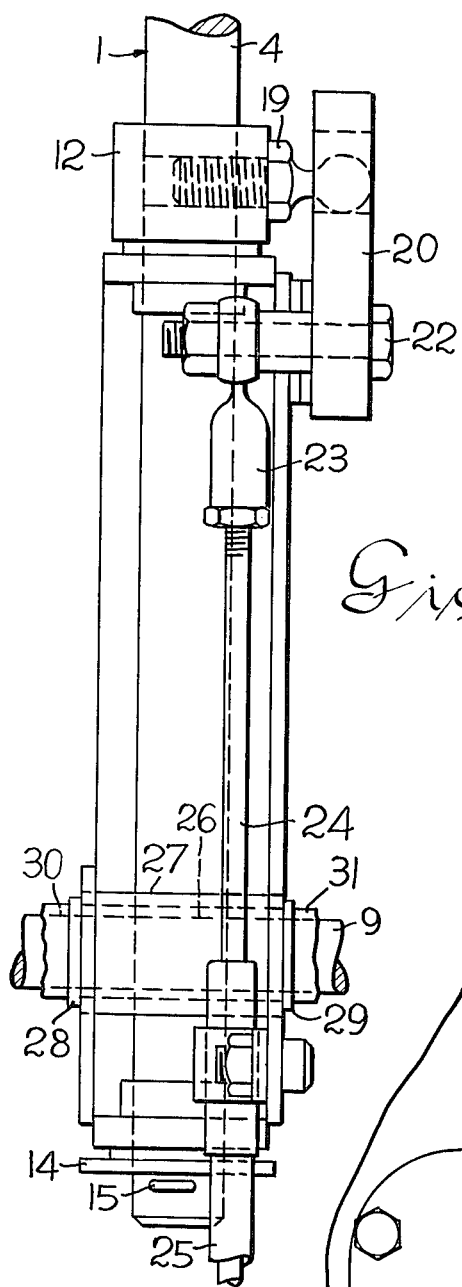
FIG. 5 is an enlarged fragmentary view of the lever shown in FIG. 3 taken on line V—V of FIG. 4.

Referring to FIG. 1, the shift lever 1 includes a handle 2 rotatable on a longitudinal axis. The handle 2 and indicator dial 3 rotate with the rod 4 of the shift lever 1. The control console 5 forms a longitudinal slot 6 defining the pivotal movement of the shift lever 1. The indicator dial 3 includes numbers indicating the five forward speeds and one reverse speed on the dial angularly spaced relative to each other. The abutments 7 and 8 on opposing ends of the slot 6 each carry an arrow centrally aligned with the slot 6 for indicating the numbered position of the shift lever as it is rotated and pivoted to the extreme end of the slot.

FIG. 3 illustrates a plan view of the indicator on the shift lever and control console. The handle 2 and rod 4 are shown extending from the slot 6. The indicator dial 3 is mounted on the rod 4 of the shift lever 1. The indicator dial 3 shows the number of the gear ratio for each position of the handle 2 for selecting the desired shift rail in the transmission. The pointers on the abutments 7 and 8 are also shown which point to the numbered position of the gear ratio when the shift lever is shifted fore or aft.

FIG. 4 is a side-elevation view showing the shift lever pivotally mounted on a bolt 9 in the control console 5. A control console 5 is mounted on the platform 10 of the motor vehicle 100. The rod 4 is mounted in a base 13 having a channel 11 with a nut 12 preventing the rod from moving downwardly and a washer 14 and key 15 preventing the rod from moving upwardly in the base 13. The base 13 is connected to a bearing 16 pivotally connected to the link 17, which in turn is connected through the bell crank 18 of the actuating linkage for the shifting of the vehicle transmission.

FIG. 5 illustrates the shift lever 1 with the rod 4 retained axially by the nut 12 and washer 14 and key 15. The stud bolt 19 threadedly engages the rod 4 and locks the nut 12 in a fixed position on the rod 4. As the rod 4 is rotated, the bell crank 20 pivots on its pivotal axis defined by the pin 21. The bolt 22 is pivotally connected to the connector 23 which in turn reciprocates the cable 24 of the sheathed cable 25. The cable 24 reciprocates to operate a linkage for selectively engaging a shift rail in the transmission.

The shift lever 1 is pivotally mounted on the bolt 9 which extends through a bushing 26 in the sleeve 27. The washers 28 and 29 and spacers 30 and 31 align the shift lever centrally within the base 13.

Figure 6:
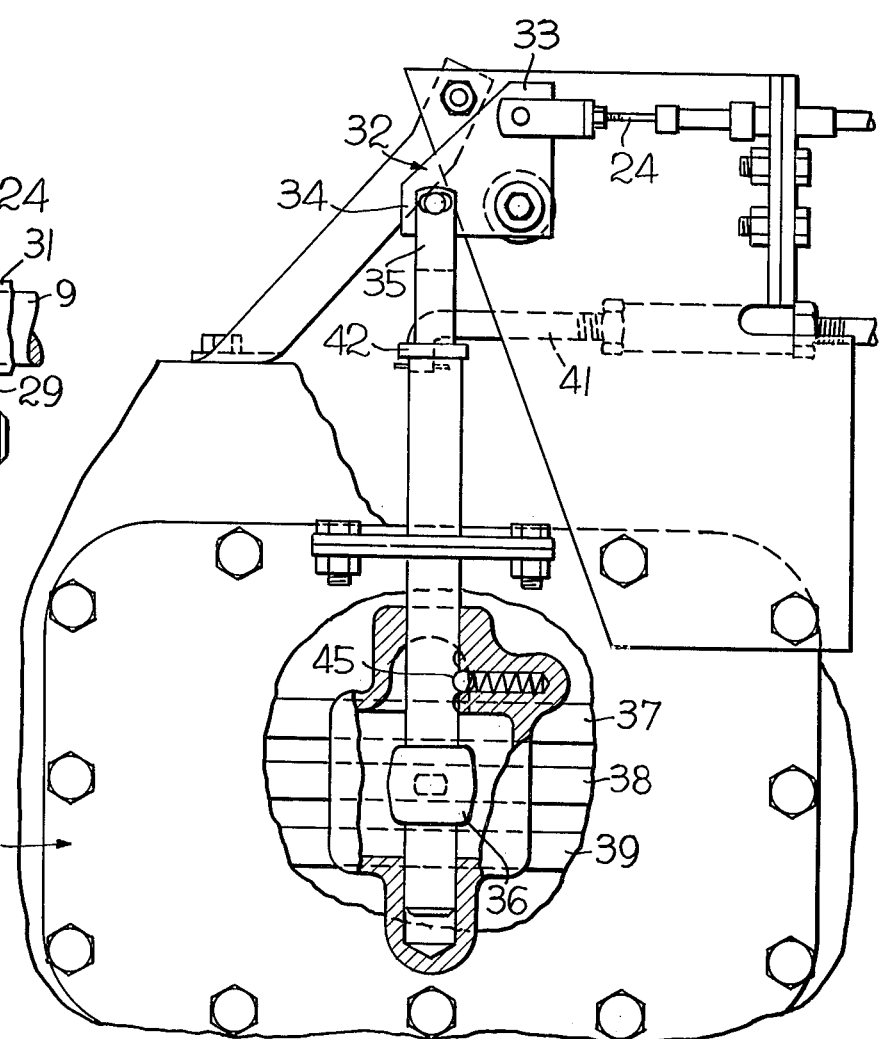
FIG. 6 is a plan view of a mechanism connected between the shift lever and the transmission.

Referring to FIG. 6, the cable 24 operates the lever 32 and pivotally operates the arm 33 of the lever 32. The arm 34 operates the push shaft 35 which carries the shift selector 36. The shift selector 36 selectively engages one of the shift rails 37, 38 and 39 of the transmission 40.

The link 41 is pivotally connected to the bell crank 18 and pivots the arm 42 on the shaft 35. When the desired shift rail is engaged by the selector 36, the shaft 35 is then pivoted by the link 41 to shift the rail reciprocally for shifting of gears through one of the shifting forks of which shifting fork 43 is shown. Each rail 37, 38 and 39 carries a shifting fork. The shifting fork 43 is carried on shift rail 37.

A detente 45 retains the shaft 35 in its selected position in response to rotation of the handle 2 of the shift lever 1.

The operation of this device will be described in the following paragraphs.

The shift lever 1 is normally in the neutral position as indicated by the numeral 51. When it is desired to shift the transmission, the handle 2 is rotated to the position indicated on the indicator dial 3. This rotation of the rod 4 pivots the bell crank 20 which in turn reciprocates the push rod 35 and the selector 36 to engage the desired shift rail. When the desired shift rail is engaged, the shift lever 1 is then pivoted fore or aft, depending on the desired gear ratio which is to be engaged. When the shift lever is pivoted to the position as shown in FIG. 1, the transmission is then in the second gear ratio. Any of the indicated five forward speeds or reverse speed can be selected by initially rotating the handle 2 to the desired position and then pivoting fore and aft of the lever for the desired gear ratio.

When the shift lever is returned to its neutral position, the shift rail is returned to a neutral position and the transmission is disengaged. The indicator dial and the pointers may be arranged so that a pointer is on the indicator dial or on the control console and the numbers may be positioned on the control console or the indicator dial as desired. The basic function of the indicator is to show to the operator the position of the shift lever and the shifted position of the transmission when the transmission is shifted or if the transmission is in neutral.

The embodiments of the invention in which an exclusive property or privilege is claimed are defined as follows:

1. A rotatable and pivotal shift lever and indicator for a vehicle transmission comprising, a shift lever including a handle for controlling the movement of the shift lever, means rotatably supporting said lever for rotation on a longitudinal axis, means pivotally supporting said lever for pivotal movement of said lever on a transverse axis, a control console having a gate plate defining the pivotal movement of said shift lever, a shift mechanism connected to said shift lever for shifting a vehicle transmission between gear ratios responsive to rotating and pivoting of said shift lever, an indicator on said shift lever and control console correlated with the gear ratio positions of the transmission for indicating to the operator the selected transmission gear ratio and shift lever position.

2. A rotatable and pivotal shift lever and indicator for a vehicle transmission as set forth in claim 1 wherein said handle defines a greater transverse width than length fore and aft for conveniently rotating said handle.

3. A rotatable and pivotal shift lever and indicator for a vehicle transmission as set forth in claim 1 wherein said indicator includes a pointer mounted on said lever, numbered positions of said shift lever on said control console as indicated by the pointer to the operator the position of the shift lever.

4. A rotatable and pivotal shift lever and indicator for a vehicle transmission as set forth in claim 1 wherein said indicator includes an indicator surface on said shift lever, a plurality of numbered shift lever positions on said surface, at least one pointer on said control console to correlate with said numbers on said indicator surface to indicate to the operator the shifted position of said shift lever.

5. A rotatable and pivotal shift lever and indicator for a vehicle transmission as set forth in claim 1 wherein said control console includes a gate plate forming a longitudinal slot defining the pivotal movement of said shift lever.

6. A rotatable and pivotal shift lever and indicator for a vehicle transmission as set forth in claim 1 wherein said indicator includes an indicator dial mounted on said shift lever, said control console includes a gate plate adjacent to path of movement of said indicator dial as said shift lever is pivoted fore and aft, said gate plate includes a raised portion for correlation with the indicator dial on said control console to indicate to the operator the shifted position of said lever.

7. A rotatable and pivotal shift lever and indicator for a vehicle transmission as set forth in claim 1 wherein said control console defines an arcuate gate plate defining the pivotal movement of said shift lever, a dial on said lever pivoting in an arcuate path adjacent said gate plate.

8. A rotatable and pivotal shift lever and indicator for a vehicle transmission as set forth in claim 1 wherein said indicator includes an indicator dial on said shift lever, said control console includes a gate plate defining a radius of curvature coincidental with the radius of curvature defined by said indicator dial as said shift lever is pivoted, said gate plate forming a slot defining the pivotal movement of said shift lever on said control console.

9. A rotatable and pivotal shift lever and indicator for a vehicle transmission as set forth in claim 1 wherein said control console includes a gate plate, said gate plate forms a slot defining the pivotal movement of said shift lever whereby the central position of said slot defines a neutral position of said lever and the extreme positions of said slot define the shifted position of said lever.

10. A rotatable and pivotal shift lever and indicator for a vehicle transmission as set forth in claim 1 including a transmission, shift rails in said transmission, a shift rail selector for selectively engaging one of said plurality of shift rails in said transmission, connecting means between said shift lever and said shift rails for selectively engaging and reciprocating said shift rails for shifting said transmission when said lever is rotated and pivoted for shifting said transmission.

* * * * *